US012107360B2

(12) United States Patent
Tsukamoto

(10) Patent No.: US 12,107,360 B2
(45) Date of Patent: Oct. 1, 2024

(54) TERMINAL CONNECTION STRUCTURE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Yuya Tsukamoto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 354 days.

(21) Appl. No.: 17/772,005

(22) PCT Filed: Oct. 29, 2020

(86) PCT No.: PCT/JP2020/040666
§ 371 (c)(1),
(2) Date: Apr. 26, 2022

(87) PCT Pub. No.: WO2021/085542
PCT Pub. Date: May 6, 2021

(65) Prior Publication Data

US 2022/0399670 A1 Dec. 15, 2022

(30) Foreign Application Priority Data

Nov. 1, 2019 (JP) ................................ 2019-200198

(51) Int. Cl.
*H01R 13/20* (2006.01)
*H01R 13/11* (2006.01)
(Continued)

(52) U.S. Cl.
CPC ........... *H01R 13/20* (2013.01); *H01R 13/187* (2013.01); *H01R 13/112* (2013.01); *H01R 13/15* (2013.01)

(58) Field of Classification Search
CPC . H01R 13/20; H01R 4/28; H01R 4/48; H01R 13/11; H01R 13/112; H01R 13/15;
(Continued)

(56) References Cited

U.S. PATENT DOCUMENTS 5,716,244 A 2/1998 Egenolf et al.
7,278,891 B2 10/2007 Cvasa et al.
(Continued)

FOREIGN PATENT DOCUMENTS

JP 2011-238558 A 11/2011

OTHER PUBLICATIONS

International Search Report issued on Dec. 28, 2020 for WO 2021/085542 A1 (6 pages).

*Primary Examiner* — Renee S Luebke
*Assistant Examiner* — Paul D Baillargeon
(74) *Attorney, Agent, or Firm* — Venjuris, P.C.

(57) ABSTRACT

It is aimed to provide a terminal connection structure of a novel structure capable of advantageously preventing rotational displacements between two terminals without being accompanied by an increased spring force of a spring member. A terminal connection structure is provided with a first terminal 10 including a first connecting portion 32, a second terminal 12 including a second connecting portion 24, and a spring member 14 for sandwiching the first and second connecting portions 32, 24 in an overlapped state. At least one 44 of contact surfaces of the first and second connecting portions 32, 24 has a contact point portion 42 in the form of a curved surface bulging toward the other contact surface 30. The spring member 14 includes a press-
(Continued)

ing point 50 for pressing the first and second connecting portions 32, 24 in an overlapping direction at a position separated from the contact point portion 42.

4 Claims, 8 Drawing Sheets

(51) Int. Cl.
*H01R 13/15* (2006.01)
*H01R 13/187* (2006.01)

(58) Field of Classification Search
CPC ... H01R 13/18; H01R 13/187; H01R 13/2407
See application file for complete search history.

(56) References Cited

U.S. PATENT DOCUMENTS

| | | | | |
|---|---|---|---|---|
| 7,556,542 | B2 | 7/2009 | Lischeck et al. | |
| 10,224,658 | B2 | 3/2019 | Marsh et al. | |
| 10,389,055 | B1 | 8/2019 | Lui et al. | |
| 11,233,350 | B2 * | 1/2022 | Shimizu ................. | H01R 13/04 |
| 2020/0395703 | A1 | 12/2020 | Shimizu | |
| 2020/0403342 | A1 | 12/2020 | Nishijima | |

* cited by examiner

TERMINAL CONNECTION STRUCTURE

CROSS REFERENCE TO RELATED APPLICATIONS

This application is a national phase of PCT application No. PCT/JP2020/040666, filed on 29 Oct. 2020, which claims priority from Japanese patent application No. 2019-200198, filed on 1 Nov. 2019, all of which are incorporated herein by reference.

TECHNICAL FIELD

The present disclosure relates to a terminal connection structure for electrically connecting two terminals.

BACKGROUND

Conventionally, a structure for sandwiching connecting portions of two terminals in an overlapped state by a spring member, for example, as described in Japanese Patent Laid-open Publication No. 2011-238558 (Patent Document 1) has been proposed as a terminal connection structure for electrically connecting two terminals. A contact point portion in the form of a projecting curved surface is provided between the connecting portions of the two terminals, and reliable contact at the contact point portion is more stably ensured by the spring member.

PRIOR ART DOCUMENT

Patent Document

Patent Document 1: JP 2011-238558 A

SUMMARY OF THE INVENTION

Problems to be Solved

In such a conventional terminal connection structure, a pressing force of the spring member concentrates on the contact point portion. Thus, if an external force caused by the swing of a wire connected to the terminal is applied, there has been a possibility that the two terminals are relatively rotationally displaced about the contact point portion. If the two terminals are rotationally displaced, plating on terminal surfaces might be worn to increase a contact resistance or electrical connection might be made unstable by this rotation. Against this, it is considered to increase the pressing force by increasing a spring force of the spring member, but an increase in the insertion resistance of the terminals into the spring member is unavoidable. Thus, this measure could not be said to be desirable.

The present disclosure was developed in view of the above situation and aims to provide a terminal connection structure of a novel structure capable of advantageously preventing rotational displacements between two terminals without being accompanied by an increased spring force of a spring member.

Means to Solve the Problem

The present disclosure is directed to a terminal connection structure with a first terminal including a first connecting portion, a second terminal including a second connecting portion, and a spring member for sandwiching the first and second connecting portions in an overlapped state, wherein at least one of contact surfaces of the first and second connecting portions has a contact point portion in the form of a curved surface bulging toward the other contact surface, and the spring member includes a pressing point for pressing the first and second connecting portions in an overlapping direction at a position separated from the contact point portion.

Effect of the Invention

According to the present disclosure, it is possible to provide a terminal connection structure capable of advantageously preventing rotational displacements between two terminals without being accompanied by an increased spring force of a spring member.

DETAILED DESCRIPTION TO EXECUTE THE INVENTION

Description of Embodiments of Present Disclosure

Figure 1:
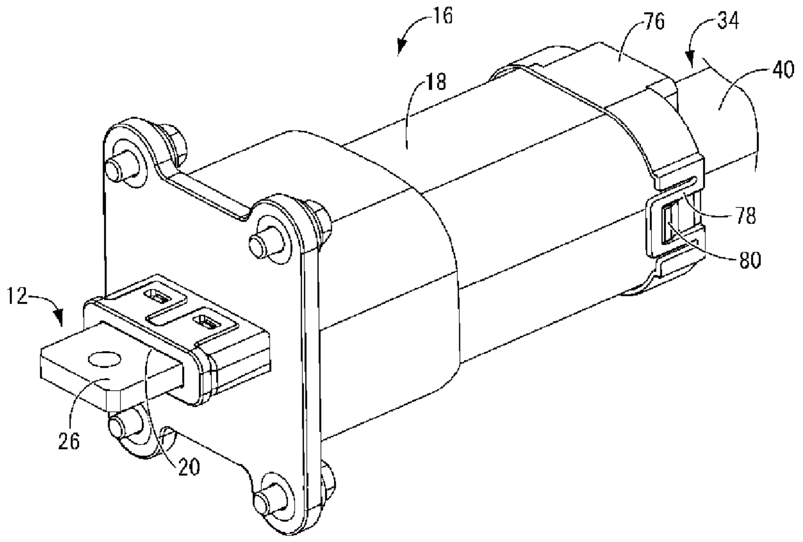
FIG. 1 is a perspective view showing a state where a first terminal and a second terminal connected using a terminal connection structure according to a first embodiment are accommodated in a first housing.

First, embodiments of the present disclosure are listed and described.

(1) The terminal connection structure of the present disclosure is provided with a first terminal including a first connecting portion, a second terminal including a second connecting portion, and a spring member for sandwiching the first and second connecting portions in an overlapped state, wherein at least one of contact surfaces of the first and second connecting portions has a contact point portion in the form of a curved surface bulging toward the other contact surface, and the spring member includes a pressing point for pressing the first and second connecting portions in an overlapping direction at a position separated from the contact point portion.

According to the terminal connection structure of the present disclosure, the first connecting portion of the first terminal and the second connecting portion of the second terminal are sandwiched in an overlapped state by the spring member, and the pressing point of the spring member is provided at the position separated from the contact point portion provided between overlapping surfaces of the first connecting portion and the second terminal. In this way, a rotation impeding force by the spring member to impede relative rotation of the first terminal and the second terminal about the contact point portion can be increased by a separation distance between the contact point portion and the pressing point. As a result, even if an external force such as a swinging motion is transmitted from the wire connected to the first terminal and the second terminal, relative rotational displacements of the first terminal and the second terminal about the contact point portion can be advantageously impeded without increasing a spring force of the spring member.

Note that the contact point portion to be provided between the contact surfaces of the first terminal and the second terminal may be provided on at least one contact surface or may be provided on both contact surfaces. To stably ensure a low contact resistance by increasing a contact area between the contact surfaces, it is preferable to provide the contact point portion on one contact surface and form the other contact surface into a flat surface.

(2) Preferably, the spring member includes a pair of pressing pieces to be respectively overlapped on the first and second connecting portions from both sides in the overlapping direction and a coupling portion coupling the pair of pressing pieces, and at least one of the pressing pieces includes two pressing points shaped to bulge toward the other pressing piece at two positions separated from each other across the contact point portion. This is because at least one of the pair of pressing pieces of the spring member to be respectively overlapped on the first and second connecting portions from the both sides in the overlapping direction is provided with the pressing points shaped to bulge toward the other pressing piece at two positions separated from each other across the contact point portion. In this way, relative rotational displacements of the first and second terminals about the contact point portion can be more stably impeded.

(3) In (2) described above, preferably, two pressing points are provided on each of the pair of pressing pieces of the spring member, and the pressing points of one pressing piece and those of the other pressing piece are facing each other in the overlapping direction. This is because a pressing force of the spring member can be applied to the first and second connecting portions from two positions separated across the contact point portion at the same positions on the both sides in the overlapping direction. In this way, relative rotational displacements of the first and second terminals about the contact point portion can be more stably impeded.

(4) In (2) or (3) described above, preferably, the pressing piece of the spring member includes a slit extending between the two pressing points and open in a projecting end of the pressing piece. This is because the pressing points provided on the both sides across the contact point portion are mutually independently displaceable and the pressing force can be stably applied, more flexibly following mutual displacements of the first and second terminals.

(5) Preferably, the contact point portion is in the form of a strip expanding over an entire length in a width direction in a part of the contact surface in a longitudinal direction and is curved with a predetermined curvature in each of the longitudinal direction and the width direction. This is because a large contact area can be stably maintained and a low contact resistance can be stably ensured against fine relative displacements of the first and second terminals since the relatively large strip-like contact point portion expanding over the entire length in the width direction is curved with the predetermined curvature in each of the longitudinal direction and the width direction. For example, by providing the contact point portion of this mode on the first terminal constituting a female terminal, a resistance in an initial stage of insertion can be reduced even if the second terminal constituting a male terminal is inserted in either one of the longitudinal direction and the width direction of the first terminal.

(6) Preferably, the first terminal includes the contact point portion on the contact surface of the first connecting portion and is accommodated and held in the first housing, the first housing accommodates and holds the spring member around the first connecting portion of the first terminal, the first housing includes a second terminal insertion hole communicating with a clearance between facing surfaces of the first connecting portion and the pressing point of the spring member, and the second connecting portion of the second terminal inserted through the second terminal insertion hole is inserted between the facing surfaces and the first and second connecting portions are sandwiched in an overlapped state in the overlapping direction by the spring member. This is because the contact point portion and the pressing point can be advantageously positioned via the first housing since the first terminal including the contact point portion and the spring member including the pressing point are accommodated in the first housing. In this way, a rotation impeding force by the contact point portion and the pressing point can be more stably exerted.

Details of Embodiment of Present Disclosure

Specific examples of a terminal connection structure of the present disclosure are described below with reference to the drawings. Note that the present disclosure is not limited to these illustrations and is intended to be represented by claims and include all changes in the scope of claims and in the meaning and scope of equivalents.

First Embodiment

A first embodiment of the present disclosure is described below with reference to FIGS. 1 to 10. As shown in FIG. 2, a terminal connection structure in this embodiment includes a first terminal 10, a second terminal 12 and a spring member 14. Note that, in the following description, a Z direction, a Y direction and an X direction of FIG. 2 are referred to as an upward direction, a widthwise leftward direction and a longitudinal rearward direction. Further, for a plurality of identical members, only some members may be denoted by a reference sign and the other members may not be denoted by the reference sign.

<Connector Housing 18>

Figure 2:
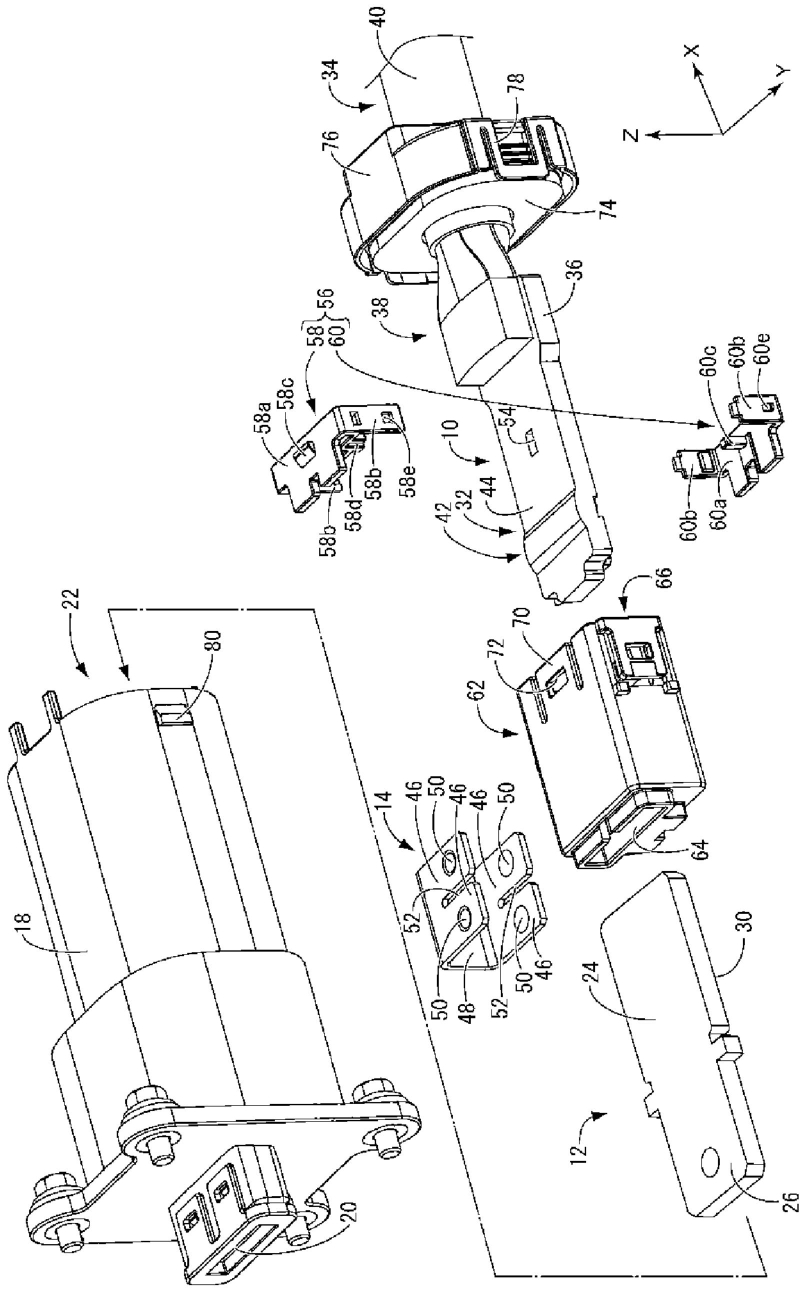
FIG. 2 is an exploded perspective view of FIG. 1.

As shown in FIGS. 1 and 2, the first terminal 10 is accommodated into a connector housing 18 of a connector 16 together with the spring member 14, and used as the connector 16. The connector housing 18 is made of synthetic resin and in the form of a rectangular tube extending in a longitudinal direction and open in a front-rear direction. A second terminal insertion hole 20 into which the second terminal 12 is inserted is formed on a front side of the connector housing 18, and a first terminal insertion hole 22 into which the first terminal 10 is inserted is formed on a rear side of the connector housing 18. By inserting the second terminal 12 into the second terminal insertion hole 20 of the connector 16 shown in FIG. 1, the terminal connection structure of this embodiment is realized and the first terminal 10 and the second terminal 12 are electrically connected while advantageously preventing defects.

<Second Terminal 12>

Figure 3:
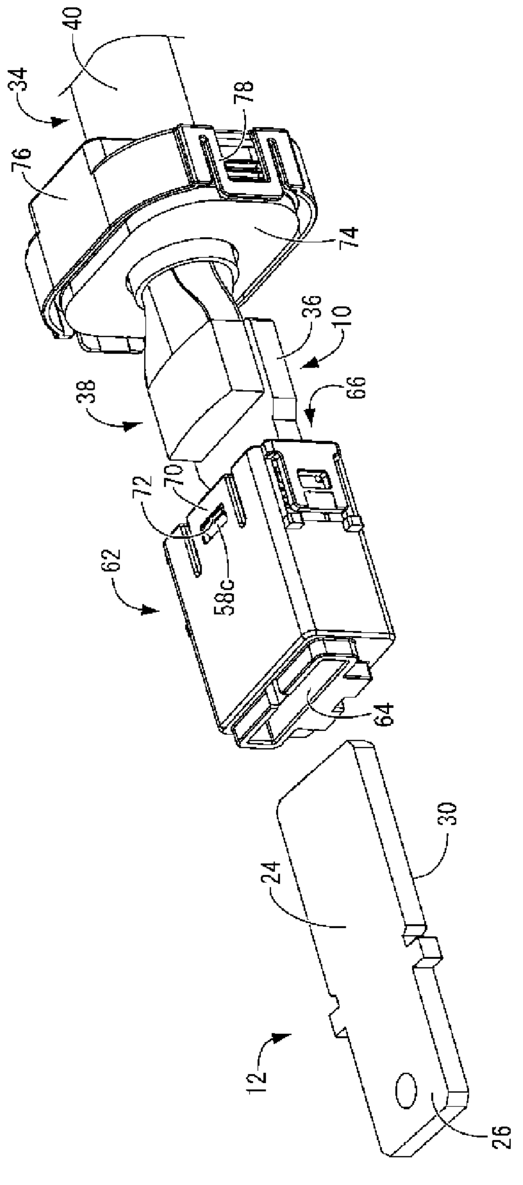
FIG. 3 is an overall perspective view showing an assembling state of the first terminal of FIG. 2.
Figure 4:
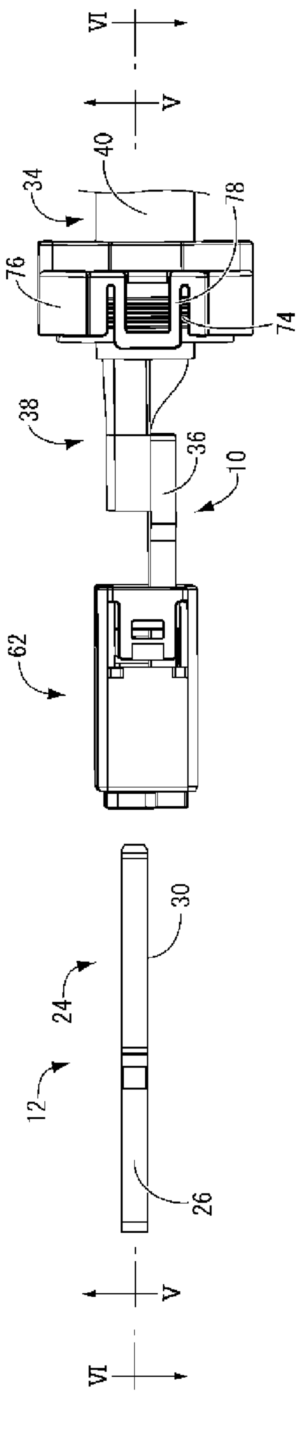
FIG. 4 is a side view of FIG. 3.

As shown in FIGS. 2 and 3, the second terminal 12 is a connection terminal in the form of a flat plate. A metal material such as copper, copper alloy, aluminum, aluminum alloy or stainless steel can be appropriately used as a material of the second terminal 12. A surface processing such as silver plating, tin plating or aluminum plating may be applied to the second terminal 12 according to the type of the constituent metal thereof and a use environment. The second terminal 12 can be, for example, formed by press punching a metal plate excellent in conductivity. The second terminal 12 includes a second connecting portion 24 on a tip side (rear side in FIGS. 2 and 3) and an external device connecting portion 26 to be connected to an unillustrated external device on a base end side (front side in FIGS. 2 and 3). Further, the second terminal 12 has a contact surface 30 to be brought into contact with the first terminal 10 on a surface facing the first terminal 10 when the second terminal 12 is inserted into the connector housing 18. The contact surface 30 is a flat surface formed on the lower surface of the second connecting portion 24 of the second terminal 12. The second terminal 12 is electrically connected to the first terminal 10 by being inserted into the connector housing 18. Note that the second terminal 12 is also used by being accommodated into an unillustrated housing, similarly to the first terminal 10.

<First Terminal 10>

As shown in FIG. 2, the first terminal 10 is also a connection terminal in the form of a flat plate. A metal material such as copper, copper alloy, aluminum, aluminum alloy or stainless steel can be appropriately used as a material of the first terminal 10. A surface processing such as silver plating, tin plating or aluminum plating may be applied to the first terminal 10 according to the type of the constituent metal thereof and a use environment, similarly to the second terminal 12, and can be, for example, formed by press punching a metal plate excellent in conductivity. The first terminal 10 includes a first connecting portion 32 to be electrically connected to the second terminal 12 on a tip side (front side in FIG. 2) and a wire connecting portion 36 to be connected to a coated wire 34 on a base end side (rear side in FIG. 2). A core 38 of the coated wire 34 is conductively connected to this wire connecting portion 36. The coated wire 34 is structured such that the core 38 formed by bundling a plurality of wires made of copper, aluminum or another metal, which is a conductor, is covered with an insulation coating 40 having an electrically insulating property and made of ethylene resin, styrene resin or the like. The core 38 exposed by stripping the insulation coating 40 in an end of the wire 34 is fixed to the wire connecting portion 36 of the first terminal 10 using a known technique such as resistance welding, whereby the core 38 of the coated wire 34 is conductively connected to the first terminal 10.

<Contact Point Portion 42>

The first terminal 10 has a contact surface 44 to be brought into contact with the second terminal 12 on a surface facing the second terminal 12. The contact surface 44 is formed on the upper surface of the first connecting portion 32 of the first terminal 10. The contact surface 44 of the first connecting portion 32 of the first terminal 10 has a contact point portion 42 in the form of a curved surface bulging toward the second connecting portion 24 of the second terminal 12 in a state connected to the second terminal 12. As shown in FIG. 2, the contact point portion 42 has a gently curved surface which is nearly a flat surface. In this embodiment, the contact point portion 42 is in the form of a strip expanding over an entire length in a width direction in a part of the contact surface 44 of the first connecting portion 32 in the longitudinal direction, and formed to be curved with a predetermined curvature with respect to each of the longitudinal direction and the width direction.

<Spring Member 14>

Figure 8:
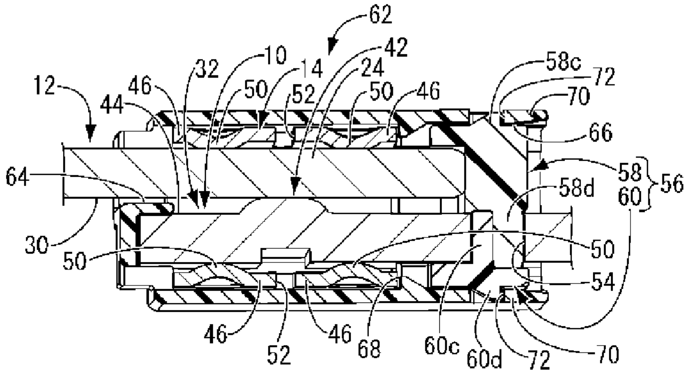
FIG. 8 is an enlarged section along VIII-VIII in FIG. 7 (showing a state where the second terminal is inserted in the first housing).
Figure 9:
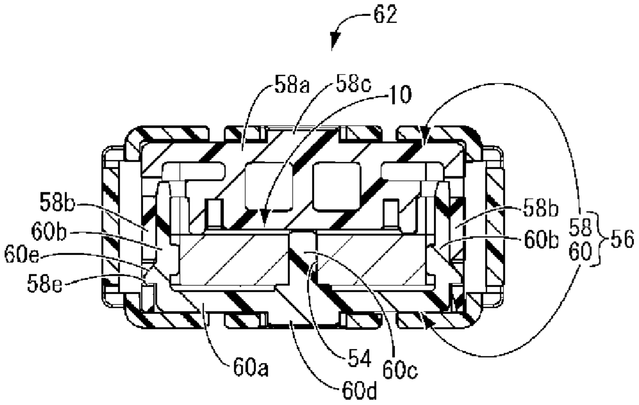
FIG. 9 is an enlarged section along IX-IX in FIG. 7.
Figure 10:
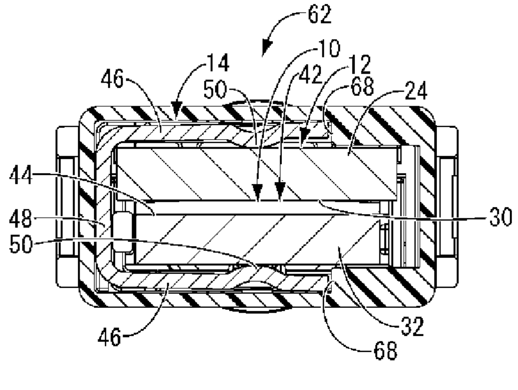
FIG. 10 is an enlarged section along X-X in FIG. 7 (showing the state where the second terminal is inserted in the first housing).

The spring member 14 is formed using various pressable or punchable metal materials such as strip plates of spring steel, stainless steel, brass, phosphor bronze and beryllium copper. A surface processing such as silver plating, tin plating or aluminum plating may be applied to the spring member 14 according to the type of the constituent metal thereof and a use environment. For example, as shown in FIGS. 8 and 10, the spring member 14 is such that a pair of pressing pieces 46, 46 are respectively overlapped to sandwich the first and second connecting portions 32, 24 from both sides (upper and lower sides) in an overlapping direction (vertical direction in FIGS. 8 and 10) with the second connecting portion 24 of the second terminal 12 overlapped on the first connecting portion 32 of the first terminal 10. Widthwise left end parts of the pair of pressing pieces 46, 46 are coupled by a coupling portion 48 in the form of a rectangular flat plate (see FIG. 10). Each of the pair of pressing pieces 46, 46 of the spring member 14 has pressing points 50 bulging toward the other pressing piece 46 at two positions separated in the longitudinal direction across the contact point portion 42 (see FIG. 8).

As shown in FIG. 8, these pressing points 50 provided on the spring member 14 press the first and second connecting portions 32, 24 in the overlapping direction at positions separated from the contact point portion 42. Further, the pressing points 50 of one pressing piece 46 and those of the other pressing piece 46 are arranged to face each other in the overlapping direction. In addition, as shown in FIGS. 2 and 8, each of the both pressing pieces 46 of the spring member 14 includes a slit 52 extending in width directions of the first and second connecting portions 32, 24 and open in the projecting end of the pressing piece 46 between the pressing points 50 provided at two positions separated from each other in the longitudinal direction. In this way, the pressing points 50 provided on both sides across the contact point portion 42 are mutually independently displaceable. Therefore, a pressing force can be stably applied, more flexibly following mutual displacements of the first and second connecting portions 32, 24.

<Retainer 56>

As shown in FIG. 2, the first terminal 10 includes an engaging hole 54 formed between the first connecting portion 32 and the wire connecting portion 36 and having a rectangular cross-sectional shape extending in the longitudinal direction. The engaging hole 54 is formed to penetrate through the first terminal 10 in a plate thickness direction. The retainer 56 is, for example, made of synthetic resin excellent in heat resistance and rigidity and includes an upper retainer divided body 58 and a lower retainer divided body 60. The upper retainer divided body 58 includes a ceiling wall 58*a* in the form of a rectangular flat plate and a pair of side walls 58*b* in the form of rectangular flat plates projecting downward from both widthwise end edge parts of the ceiling wall 58*a*. An engaging projection 58*c* projecting upward and having a triangular cross-sectional shape is provided on the upper surface of the ceiling wall 58*a*, and an engaging protrusion 58*d* having a rectangular cross-section and projecting downward is provided on the lower surface of the ceiling wall 58*a*. Further, an engaging hole 58*a* having a rectangular cross-sectional shape is formed to penetrate in a plate thickness direction in a lower part of the outer surface of each of the pair of side walls 58*b*, 58*b* in the form of rectangular flat plates. The lower retainer divided body 60 includes a bottom wall 60*a* in the form of a rectangular flat plate and a pair of side walls 60*b*, 60*b* in the form of rectangular flat plates projecting upward from both widthwise end edge parts of the bottom wall 60*a*. An engaging protrusion 60*c* having a rectangular cross-section and projecting upward is provided on the upper surface of the bottom wall 60*a*, and an engaging projection 60*d* projecting downward and having a triangular cross-section is provided on the lower surface of the bottom wall 60*a* (see FIGS. 8 and 9). Further, an engaging projection 60*e* projecting outward in the width direction and having a triangular cross-sectional shape is provided on a lower part of the outer surface of each of the pair of side walls 60*b*, 60*b* in the form of rectangular flat plates.

In fixing the retainer 56 to the first terminal 10, the engaging protrusion 60*c* of the lower retainer divided body 60 is first inserted into a front side of the engaging hole 54 from below the first terminal 10. Subsequently, after the engaging protrusion 58*d* of the upper retainer divided body 58 is inserted into a rear side of the engaging hole 54 from above the first terminal 10, the upper retainer divided body 58 is pushed toward the lower retainer divided body 60. In this way, the engaging projections 60*e* of the lower retainer divided body 60 are engaged with the engaging holes 58*e* of the upper retainer divided body 58, and the upper and lower retainer divided bodies 58, 60 are fixed to the first terminal 10 while being assembled with each other.

<First Housing 62>

Figure 5:
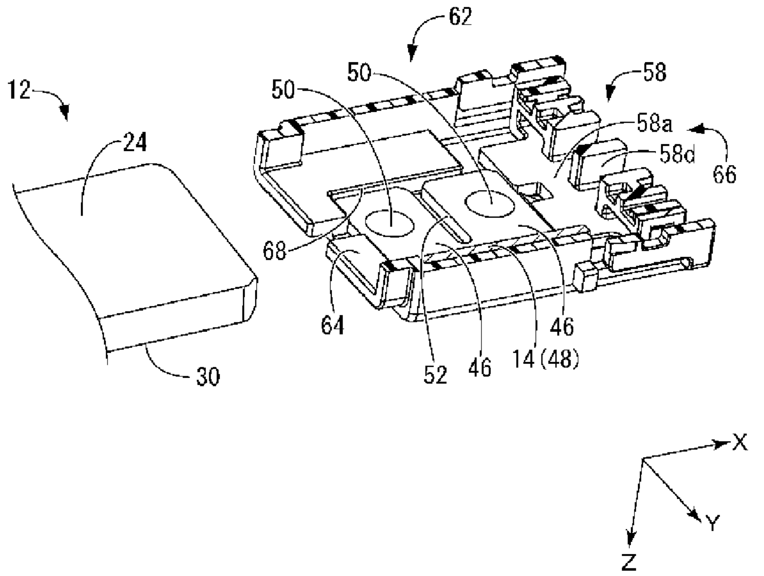
FIG. 5 is an enlarged perspective view in section along V-V in FIG. 4 when viewed obliquely from below.
Figure 6:
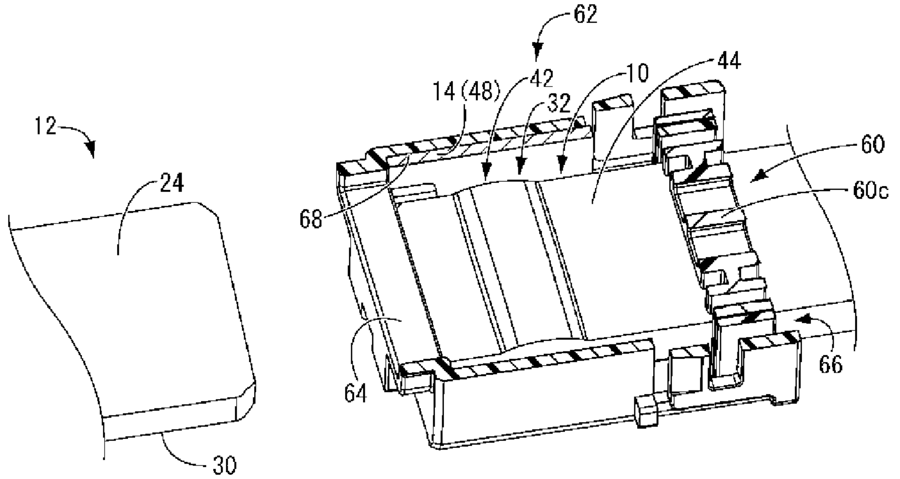
FIG. 6 is an enlarged perspective view in section along VI-VI in FIG. 4 when viewed obliquely from above.
Figure 7:
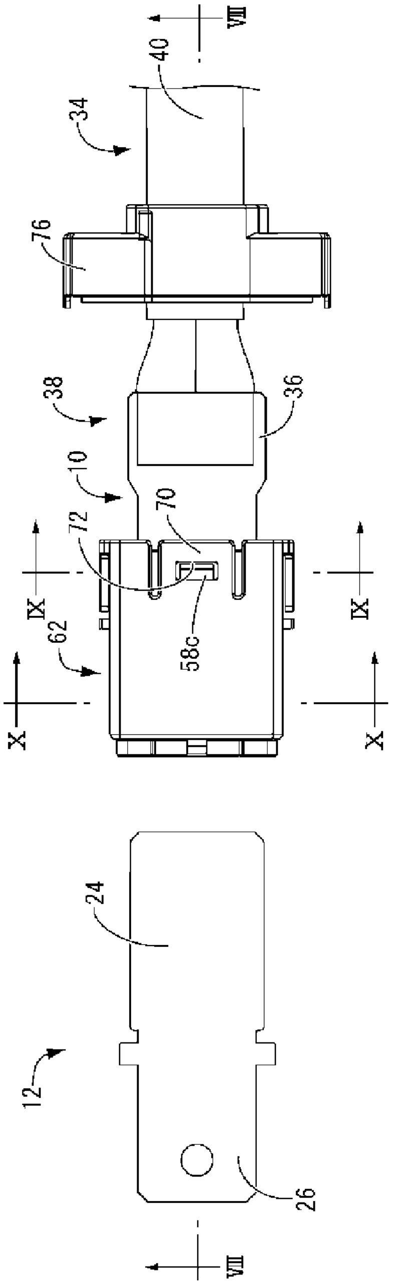
FIG. 7 is a plan view of FIG. 3.

By assembling the first housing 62 having the spring member 14 accommodated therein with the first terminal 10 having the retainer 56 mounted thereon from front, the first terminal 10 is accommodated and held in the first housing 62. As shown in FIG. 2, the first housing 62 is in the form of a rectangular tube made of synthetic resin and extending in the longitudinal direction and open in the front-rear direction. A second terminal insertion hole 64 into which the second terminal 12 is inserted is formed on a front side of the first housing 62, and a first terminal insertion hole 66 into which the first terminal 10 having the retainer 56 mounted thereon is inserted is formed on a rear side of the first housing 62. As shown in FIGS. 5, 8 and 10, a spring member accommodating portion 68 in the form of a recess for accommodating the pair of pressing pieces 46, 46 and the coupling portion 48 constituting the spring member 14 is formed on a front side of the inner surface of the first housing 62. The spring member accommodating portion 68 is open rearward in the longitudinal direction. A rear side of the spring member 14 accommodated in the spring member accommodating portion 68 is accommodated and held in the spring member accommodating portion 68 by the ceiling wall 58*a* of the upper retainer divided body 58 and the bottom wall 60*a* of the lower retainer divided body 60 constituting the retainer 56 (see FIG. 5). In addition, rear end parts of the ceiling wall and bottom wall of the first housing 62 are respectively formed into frame bodies by slits, thereby forming engaging frame bodies 70, and engaging holes 72 to be engaged with the engaging projections 58*c*, 60*d* of the retainer 56 are provided to penetrate through central parts of the engaging frame bodies 70.

<Assembling Method of First Embodiment>

An assembling method of the first embodiment is briefly described below. At first, the first terminal 10 is prepared and the core 38 of the coated wire 34 is conductively connected to the wire connecting portion 36 of the first terminal 10 using the known technique such as resistance welding. Then, a seal member 74 made of rubber and a connector housing cover member 76 are mounted on the insulation coating 40 in an end part of the coated wire 34. An engaging frame body 78 extending forward is formed in each of side walls of the connector housing cover member 76. Subsequently, the retainer 56 composed of the upper and lower retainer divided bodies 58, 60 is mounted into the engaging hole 54 of the first terminal 10. Subsequently, the first housing 62 is prepared, and the spring member 14 is inserted into the spring member accommodating portion 68 of the first housing 62 from behind and accommodated and held therein. The first terminal 10 having the retainer 56 and the like mounted thereon is inserted into the first housing 62 accommodating and holding the spring member 14 through the first terminal insertion hole 66 open rearward. In this way, the engaging projections 58*c*, 60*c* of the retainer 56 are lockingly fit into the engaging holes 72 of the engaging frame bodies 70 of the first housing 62, and the first terminal 10 is fixed to the first housing 62. Finally, the first terminal 10 having the first housing 62 mounted thereon is inserted into the connector housing 18 through the first terminal insertion hole 22. In this way, the engaging frame bodies 78 of the connector housing cover member 76 of the first terminal 10 are fit to engaging projections 80 projecting on both widthwise side walls of the connector housing 18 and the first terminal 10 is fixed to the connector housing 18, whereby the connector 16 is completed. Note that the second terminal 12 is electrically connected to the first terminal 10 by being inserted through the second terminal insertion hole 20 of the connector 16 formed in this way.

As a result of the above, the first housing 62 accommodates and holds the spring member 14 around the first connecting portion 32 of the first terminal 10 as shown in FIGS. 8 and 10. Further, as shown in FIG. 8, the first housing 62 includes the second terminal insertion hole 64 communicating with a clearance between facing surfaces of the first connecting portion 32 of the first terminal 10 and the pressing points 50 of the spring member 14. Further, the second connecting portion 24 of the second terminal 12 inserted through the second terminal insertion hole 64 is inserted between the facing surfaces of the first connecting portion 32 of the first terminal 10 and the pressing points 50 of the spring member 14. As a result, the first connecting portion 32 of the first terminal 10 and the second connecting portion 24 of the second terminal 12 are sandwiched by the pair of pressing pieces 46, 46 of the spring member 14 while being overlapped in the vertical direction, which is the overlapping direction.

According to the terminal connection structure of the present disclosure structured as just described, the second connecting portion 24 of the second terminal 12 is overlapped on the first connecting portion 32 of the first terminal 10 and the pair of pressing pieces 46, 46 of the spring member 14 are respectively overlapped to vertically sandwich the first and second connecting portions 32, 24 as shown in FIG. 8. Further, each of the pair of pressing pieces 46, 46 of the spring member 14 includes the pressing points 50 at two positions separated from each other across the contact point portion 42. In this way, even if an external force such as a swinging motion is transmitted to the first connecting portion 32 of the first terminal 10 and the second connecting portion 24 of the second terminal 12, relative rotational displacements of the first terminal 10 and the second terminal 12 about the contact point portion 42 can be more advantageously impeded in proportion to separation distances between the contact point portion 42 and the pressing points 50. That is, in this embodiment, relative rotational displacements of the first terminal 10 and the second terminal 12 about the contact point portion 42 can be advantageously impeded without increasing a spring force of the spring member 14.

Further, as shown in FIG. 8, the pressing points 50 of one pressing piece 46 and those of the other pressing piece 46 are arranged to face each other in the overlapping direction. Since the first terminal 10 and the second terminal 12 can be more efficiently pressed in the overlapping direction in this way, relative rotational displacements of the first terminal 10 and the second terminal 12 about the contact point portion 42 can be more stably impeded. Further, since the first terminal 10 including the contact point portion 42 and the spring member 14 including the pressing points 50 are accommodated in the same first housing 62, the contact point portion 42 and the pressing points 50 can be advantageously positioned via the first housing 62. Therefore, a rotation impeding force in proportion to the separation distances between the contact point portion 42 and the pressing points 50 can be more stably exerted.

In addition, in this embodiment, the contact point portion 42 is in the form of a strip expanding over the entire length in the width direction in the part of the contact surface 44 of the first connecting portion 32 in the longitudinal direction and curved with the predetermined curvature with respect to each of the longitudinal direction and the width direction. Therefore, even if the contact surface 44 of the first connecting portion 32 and the contact surface 30 of the second connecting portion 24 are finely and relatively displaced, a large contact area can be stably maintained and a low contact resistance can be stably ensured. That is, even if the second terminal 12 constituting a male terminal is inserted in either one of the longitudinal direction and the width direction of the first terminal 10, a large contact area can be stably maintained and a low contact resistance can be stably ensured by providing the first terminal 10 constituting a female terminal with the contact point portion 42 of this mode.

Other Embodiments

The technique described in this specification is not limited to the above described and illustrated embodiment. For example, the following embodiments are also included in the technical scope of the technique described in this specification.

Figure 11:
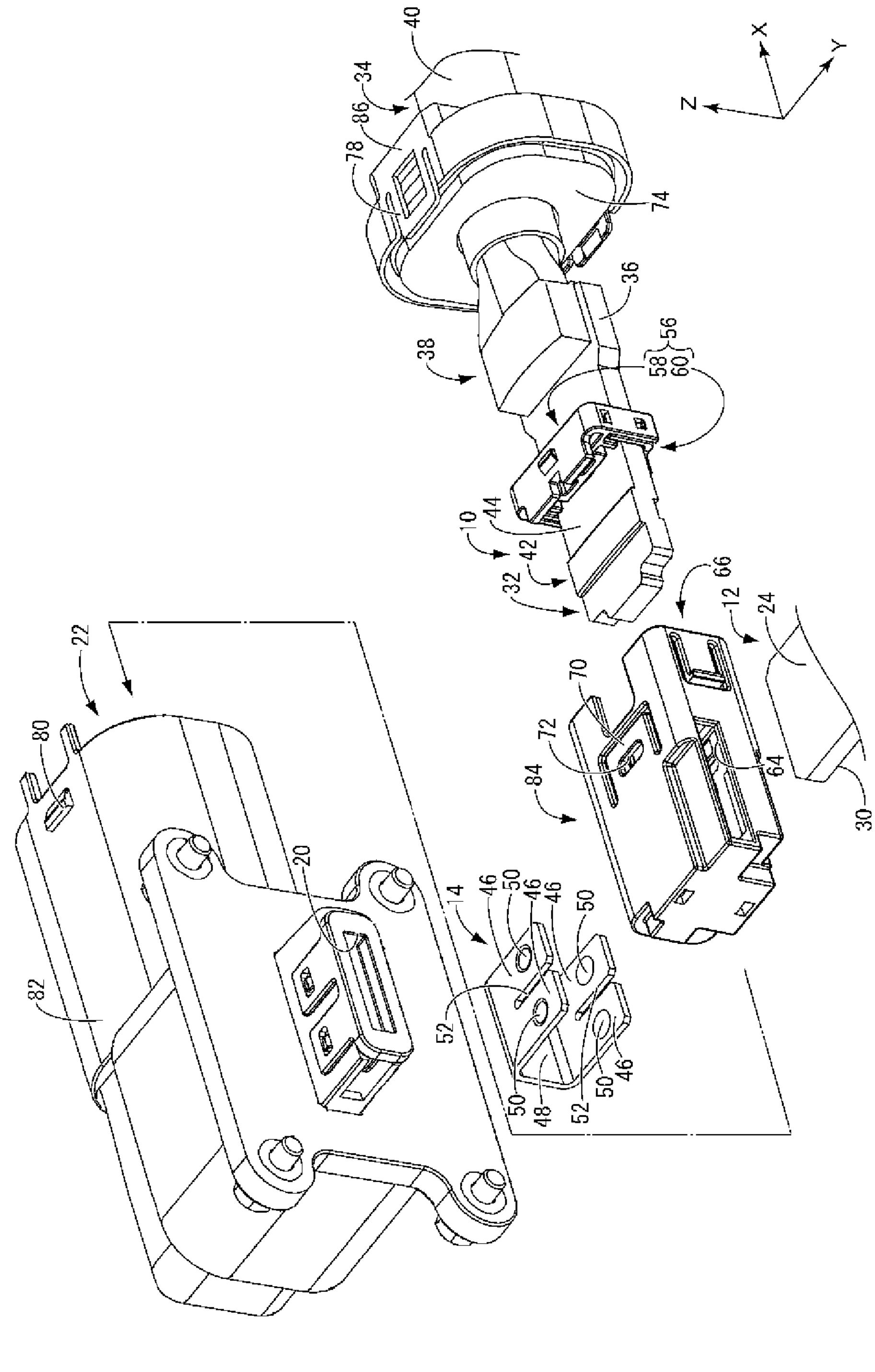
FIG. 11 is an exploded perspective view, corresponding to FIG. 2, showing a state where a first terminal and a second terminal connected using a terminal connection structure according to a second embodiment are accommodated in a first housing.

(1) Although the first connecting portion 32 of the first terminal 10 and the second connecting portion 24 of the second terminal 12 are arranged on a straight line in the first embodiment, there is no limitation to this. As in a terminal connection structure of a second embodiment of the present disclosure shown in FIG. 11, a first connecting portion 32 of a first terminal 10 and a second connecting portion 24 of a second terminal 12 may be arranged in directions orthogonal to each other. In the second embodiment, only the shapes of a connector housing 82, a first housing 84 and a connector housing cover member 86 are different from those of the first embodiment, and the same members as those of the first embodiment are usable as other members. Therefore, versatility is high since connecting directions of the first connecting portion 32 of the first terminal 10 and the second connecting portion 24 of the second terminal 12 can be easily changed only by changing the above members.

(2) Although the contact point portion 42 is provided only on the contact surface 44 of the first connecting portion 32 of the first terminal 10 in the first and second embodiments, there is no limitation to this. The contact point portion 42 may be provided only on the contact surface 30 of the second connecting portion 24 of the second terminal 12 or may be provided on both contact surfaces. Note that, to stably ensure a low contact resistance by increasing the contact area between the contact surfaces 30 and 44, it is preferable, for example, to provide the contact point portion 42 only on one contact surface 44 and form the other contact surface 30 into a flat surface as in the first embodiment.

(3) Although two pressing points 50 are provided on each of the both pressing pieces 46 to face those of the other pressing piece 46 in the first and second embodiments, there is no limitation to this. The pressing points 50 provided on the both pressing pieces 46 need not face each other, may be shifted from each other or two or an arbitrary number of the pressing points 50 may be provided only on one pressing piece 46. That is, the pressing points 50 of any mode provided on the pressing piece 46 are included in the present invention if the pressing points 50 are provided at positions separated from the contact point portion 42. For example, any of the number, shapes, formation positions and the like of the pressing points 50 provided on the pressing piece 46 can be arbitrarily set.

(4) Although the contact point portion 42 is formed to be curved with the predetermined curvature with respect to each of the longitudinal direction and the width direction in the first and second embodiments, the contact point portion 42 may be formed to be curved with the same curvature in the longitudinal direction and the width direction. Further, the contact point portion 42 of an arbitrary shape can be adopted.

(5) The slits 52 may not necessarily be formed in the spring member 14. Further, the shape of the spring member 14 is not limited to the illustrated one and another arbitrary shape such as a coil spring can be adopted.

LIST OF REFERENCE NUMERALS

10 first terminal
12 second terminal
14 spring member
16 connector
18 connector housing
20 second terminal insertion hole
22 first terminal insertion hole
24 second connecting portion
26 external device connecting portion
30 contact surface
32 first connecting portion
34 coated wire
36 wire connecting portion
38 core
40 insulation coating
42 contact point portion
44 contact surface
46 pressing piece
48 coupling portion
50 pressing point
52 slit
54 engaging hole
56 retainer

58 upper retainer divided body
58*a* ceiling wall
58*b* side wall
58*c* engaging projection
58*d* engaging protrusion
58*e* engaging hole
60 lower retainer divided body
60*a* bottom wall
60*b* side wall
60*c* engaging protrusion
60*d* engaging projection
60*e* engaging projection
62 first housing
64 second terminal insertion hole
66 first terminal insertion hole
68 spring member accommodating portion
70 engaging frame body
72 engaging hole
74 seal member
76 connector housing cover member
78 engaging frame body
80 engaging projection
82 connector housing
84 first housing
86 connector housing cover member

What is claimed is:

1. A terminal connection structure, comprising:

a first terminal including a first connecting portion;

a second terminal including a second connecting portion; and a spring member for sandwiching the first and second connecting portions in an overlapped state, wherein:

at least one of contact surfaces of the first and second connecting portions has a contact point portion in the form of a curved surface bulging toward the other contact surface, the spring member includes a pressing point for pressing the first and second connecting portions in an overlapping direction at a position separated from the contact point portion, the spring member includes a pair of pressing pieces to be respectively overlapped on the first and second connecting portions from both sides in the overlapping direction and a coupling portion coupling the pair of pressing pieces, and at least one of the pressing pieces includes two pressing points shaped to bulge toward the other pressing piece at two positions separated from each other across the contact point portion, the pressing piece of the spring member includes a slit extending between the two pressing points and open in a projecting end of the pressing piece, the spring member includes the pressing points at two positions separated across the contact point portion in a direction orthogonal to the overlapping direction of the first and second connecting portions, and the two pressing points are made mutually independently displaceable by the slit.

2. The terminal connection structure according to claim 1, wherein two pressing points are provided on each of the pair of pressing pieces of the spring member, and the pressing points of one pressing piece and those of the other pressing piece are facing each other in the overlapping direction.

3. The terminal connection structure according to claim 1, wherein the contact point portion is in the form of a strip expanding over an entire length in a width direction in a part of the contact surface in a longitudinal direction and is curved with a predetermined curvature in each of the longitudinal direction and the width direction.

4. The terminal connection structure according to claim 1, wherein:

the first terminal includes the contact point portion on the contact surface of the first connecting portion and is accommodated and held in the first housing, the first housing accommodates and holds the spring member around the first connecting portion of the first terminal, the first housing includes a second terminal insertion hole communicating with a clearance between facing surfaces of the first connecting portion and the pressing point of the spring member, and the second connecting portion of the second terminal inserted through the second terminal insertion hole is inserted between the facing surfaces and the first and second connecting portions are sandwiched in an overlapped state in the overlapping direction by the spring member.

* * * * *